US006942932B2

United States Patent
Miura et al.

(12) United States Patent
(10) Patent No.: US 6,942,932 B2
(45) Date of Patent: Sep. 13, 2005

(54) PHOSPHOR AND EL PANEL

(75) Inventors: Noboru Miura, Tokyo (JP); Yoshihiko Yano, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/364,377

(22) Filed: Feb. 12, 2003

(65) Prior Publication Data
US 2003/0152804 A1 Aug. 14, 2003

(30) Foreign Application Priority Data
Feb. 13, 2002 (JP) .................................. 2002-036075

(51) Int. Cl.[7] .......................... H05B 33/12; C09K 11/56
(52) U.S. Cl. ................. 428/690; 428/917; 252/301.4 S; 252/301.6 S; 257/102; 313/502; 313/503
(58) Field of Search .................. 252/301.65, 301.6, 252/301.45; 428/699, 917, 690; 257/102, 103; 313/502, 503, 504, 506, 509

(56) References Cited

U.S. PATENT DOCUMENTS

| 3,970,582 A | * | 7/1976 | Fan et al. ............. 252/301.6 S |
| 5,314,759 A | * | 5/1994 | Harkonen et al. .......... 428/690 |
| 6,207,077 B1 | * | 3/2001 | Burnell-Jones ........ 252/301.36 |
| 6,248,261 B1 | * | 6/2001 | Takemura et al. ..... 252/301.6 S |
| 6,379,585 B1 | * | 4/2002 | Vecht et al. ................. 423/503 |
| 2002/0005506 A1 | * | 1/2002 | Yano et al. ............ 252/301.4 R |
| 2003/0034729 A1 | * | 2/2003 | Yano et al. .................. 313/503 |

FOREIGN PATENT DOCUMENTS

| CA | 2352499 | * | 1/2002 |
| EP | 1284280 | * | 2/2003 |
| JP | 49-101282 | * | 9/1974 |
| JP | 1-206594 | | 8/1989 |
| JP | 2-51891 | | 2/1990 |
| JP | 2-148688 | | 6/1990 |
| JP | 07-282978 | * | 10/1995 |

OTHER PUBLICATIONS

Translation of JP 07–282978, Oct. 1995, Terada et al.*
Michitaka Ohura, et al. "Properties of Red–Color CaS :Eu Thin Film EL Device" ITEJ Technical Report vol. 16, No. 76, Nov. 27, 1992, pp. 7–12.

* cited by examiner

Primary Examiner—Rena Dye
Assistant Examiner—Camie S. Thompson
(74) Attorney, Agent, or Firm—Oblon, Spivak, McClelland, Maier & Neustadt, P.C.

(57) ABSTRACT

A phosphor comprising a matrix material: $Ba_{1-x}Zn_xS$ wherein $0<x<1$ and a luminescence center, typically Mn and/or Eu emits light of a sufficient color purity to eliminate a need for a filter, and in a good response and especially red light suitable in a full-color EL panel. An EL panel comprising the same is also provided.

21 Claims, 7 Drawing Sheets

PHOSPHOR AND EL PANEL

TECHNICAL FIELD

This invention relates to phosphors for use in light emitting devices such as electroluminescent (EL) devices, plasma display panels (PDP), and vacuum fluorescent displays (VFD), and more particularly, to phosphors in the form of sulfides having a light emitting function, phosphor thin films and EL panels using the same.

BACKGROUND OF THE INVENTION

There have been developed a variety of phosphors for use in PDP and VFD, including ZnO:Zn (using ZnO as a matrix material and Zn as a luminescence center) as the phosphor capable of blue green emission, ZnS:Ag and ZnS:Cu as the blue phosphor, and $(ZnCd)S:Ag+In_2O_3$ as the red phosphor. Research works continue on many other phosphor materials. Of these, the phosphors capable of blue green emission have already been used in commercial PDP and VFD because light emission of a high luminance is possible at a relatively low drive voltage.

As to the blue and red phosphors, however, the emission luminance is insufficient. It is desired to develop blue and red phosphors which produce light emission of high color purity at a low power consumption.

In the recent years, active research works have been made on thin-film EL devices as small or large-size, lightweight flat panel displays. A monochromatic thin-film EL display using a phosphor thin film of manganese-doped zinc sulfide capable of emitting yellowish orange light has already become commercially practical as a double insulation structure using thin-film insulating layers 2 and 4 as shown in FIG. 3. In FIG. 3, a predetermined pattern of lower electrodes 5 is formed on a substrate 1, and a first insulating layer 2 is formed on the lower electrode-bearing substrate 1. On the first insulating layer 2, a light-emitting layer 3 and a second insulating layer 4 are successively formed. On the second insulating layer 4, a predetermined pattern of upper electrodes 6 is formed so as to construct a matrix circuit with the lower electrodes 5. As a general rule, the phosphor thin film is annealed at temperatures below the strain point of the glass substrate in order to enhance luminance.

More recently proposed was a structure using a ceramic substrate as the substrate 1 and a thick-film dielectric layer as the insulating layer 2. Another device structure was proposed in which a high permittivity $BaTiO_3$ thin plate is used as the substrate and an electrode is formed on the back of the substrate so that the thin plate serves as an insulating layer and substrate. Since ceramics such as alumina and $BaTiO_3$ are used as the substrate, these structures permit the phosphor thin film to be annealed at high temperatures for providing an increased luminance. Also, since a thick film or thin plate dielectric layer is used as the insulating layer, these structures are resistant to insulation breakdown as compared with EL devices using a thin film as the insulating layer. Advantageously, more reliable panels can be manufactured. Then a structure of sandwiching a phosphor thin film like the double insulation structure is not necessarily needed. The insulating layer may be a single thick film or thin plate dielectric layer only on one side.

Thin-film EL displays must display images in color in order that they find use as computer, TV and similar monitors. Thin-film EL displays using sulfide phosphor thin films are fully reliable and resistant to environment, but at present regarded unsuitable as color displays because EL phosphors required to emit light in the primary colors of red, green and blue have poor characteristics. Engineers continued research on SrS:Ce (using SrS as a matrix material and Ce as a luminescence center) and ZnS:Tm as a candidate for the blue light-emitting phosphor, ZnS:Sm and CaS:Eu as a candidate for the red light-emitting phosphor, and ZnS:Tb and CaS:Ce as a candidate for the green light-emitting phosphor.

These phosphor thin films capable of emitting light in the primary colors of red, green and blue suffer from problems of emission luminance, emission efficiency and color purity. Thus color EL panels have not reached the commercial stage. With respect to red, in particular, it is known that CaS:Eu produces light emission of relatively good color purity. Improved phosphors are disclosed in JP-A 1-206594 and JP-A 2-148688. Their emission factors including luminance and efficiency are still short as the red color for full-color display. As described in JP-A 2-51891 and TV Society Technical Report Vol. 16, No. 76, pp. 7–11, the response time is as long as several seconds to several tens of seconds. These phosphors as such are impractical as the red light for a full-color moving image display which must make real-time response to drive signals.

With respect to the red color, a customary practice for acquiring red light is to use a ZnS:Mn film which is an orange phosphor thin film having a high luminance and efficiency and pass the light through a color filter to cut out red light in the wavelength region necessary as the panel from the EL spectrum of the phosphor thin film. Use of a filter complicates the manufacture process and, still worse, brings about a lowering of luminance. When red is taken out through the filter, the luminance of red EL phosphor thin film suffers a loss of 10 to 20% so that the luminance is reduced below the practically acceptable level.

To simultaneously solve the above-discussed problems associated with the phosphors for use in light emitting devices including EL devices, PDP and VFD, there remains a need for a red phosphor material capable of emitting light of a sufficient color purity to eliminate a need for a filter, at a high luminance and in good response.

SUMMARY OF THE INVENTION

An object of the invention is to provide a phosphor which emits light of a sufficient color purity to eliminate a need for a filter, with a good response and especially red light suitable for a full-color EL panel. Another object is to provide an EL panel comprising the same.

These and other objects are attained by the present invention which provides a phosphor comprising a matrix material of the general formula: $Ba_{1-x}Zn_xS$ wherein $0<x<1$, and a luminescence center contained therein. Preferably, the luminescence center is Mn or a Mn compound, or Eu or an Eu compound, or a mixture of Eu or an Eu compound and Mn or a Mn compound. In a preferred embodiment, part of the Ba is substituted with Be, Mg, Ca, Sr or Ra or a mixture of any.

Also contemplated herein is an EL panel comprising the phosphor defined above.

Investigating phosphor materials for red color, the inventors have reached the present invention. The matrix material used herein is a novel material which has been difficult to synthesize because of immature multi-component composition control technology, and a phosphor thin film made therefrom emits red light with a high purity and a high luminance.

Picking up as a phosphor CaS:Eu which is believed to be a satisfactory red EL material in the prior art, the inventors formed a thin film thereof. Using the thin film, an EL device was fabricated which failed to provide the desired light emission. Specifically, the light emission from the thin film had a luminance of about 80 cd/m² on 1 kHz driving, and the response time which is the time taken from the start of voltage application until light emission becomes stable was from several seconds to several tens of seconds. In order that such EL devices be applied as a panel, an enhancement of luminance and an acceleration in response are needed.

Based on the foregoing results, the inventors continued study on phosphor thin films of this system. The inventors have discovered that using a matrix material of a novel composition comprising barium sulfide (using barium as the alkaline earth element) and zinc sulfide, the luminance is drastically enhanced and the response time is reduced from several seconds to several tens of seconds in the prior art to 10 milliseconds to 100 milliseconds.

DETAILED DESCRIPTION OF THE INVENTION

Figure 1:
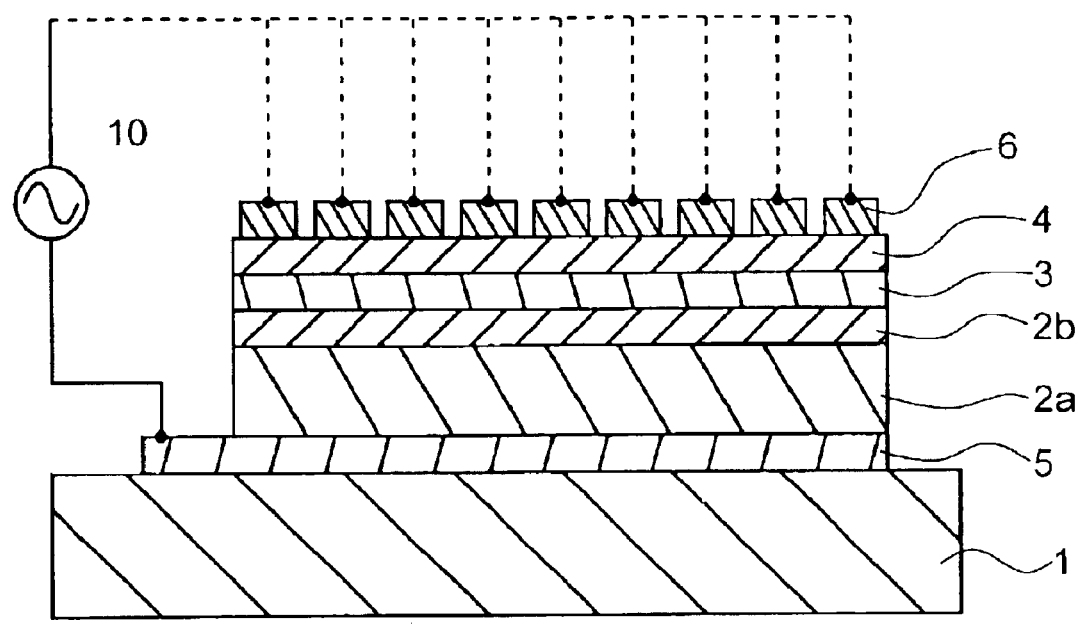
FIG. 1 is a partial cross-sectional view showing an exemplary construction of an inorganic EL device.

Several embodiments of the invention are described in detail.

The phosphor of the invention is arrived at by using barium (Ba) as an alkaline earth element, combining it with zinc (Zn) to form a sulfide matrix material, and adding a luminescence center, typically manganese (Mn) and/or europium (Eu) to the matrix material.

The preferred element added as the luminescence center and combined with the matrix material to form a red phosphor is Mn or a Mn compound and/or Eu or a Eu compound. An appropriate total amount of the luminescence center element(s) is 0.05 to 10 at % based on the barium and zinc in the matrix material. The preferred addition amount is 1 to 7 at %, especially 3 to 5 at %. It is preferred to add two or more elements as the luminescence center. When Mn is added along with Eu as the luminescence centers, for example, the response and luminance of light emission can be improved. The effects of the matrix material on the luminescence center will be described later.

The phosphor of the invention contains a barium sulfide-zinc sulfide base matrix material which is represented by the general formula:

$$Ba_{1-x}Zn_xS$$

wherein 0<x<1. Satisfactory results are obtained when x is in the range: 0<x<1. The matrix material of this composition has favorable effects on Mn and Eu serving as the luminescence center.

First, with respect to a composition wherein BaS is added to ZnS, it was found that the emission spectrum of ZnS:Mn is shifted toward the longer wavelength side. The development of a new crystal structure of multi-component composition forms a new crystal field, by which a change occurs in the emission spectrum of the luminescence center Mn to enable satisfactory red emission.

When Eu is used as the luminescence center, it is impossible to add Eu in divalent form to ZnS. However, it is possible to add Eu in divalent form to $Ba_{1-x}Zn_xS$ wherein 0<x<1, so that red emission can be produced. It is possible to add Eu in divalent form to BaS, but the resulting emission is orange color. However, in a composition wherein ZnS is added to BaS, the emission of Eu is shifted toward the longer wavelength side, so that red emission is available.

In general, a higher concentration of the luminescence center gives better results. However, too high a concentration causes concentration quenching, resulting in a lowering of emission luminance. Therefore, an optimum concentration exists for a particular matrix material. In the matrix material $Ba_{1-x}Zn_xS$ wherein 0<x<1 according to the invention, it is possible to add Eu or Mn at both Zn sites and Ba sites. Therefore, the luminescence center can be added in a high concentration without inviting concentration quenching.

When Eu and Mn are concurrently added to the matrix material $Ba_{1-x}Z_xS$ wherein 0<x<1 according to the invention, both the luminescence centers produce red emissions which overlap each other to achieve efficient red emission. For red emission at a high efficiency, Eu and Mn are preferably used in an atomic ratio of from 2:1 to 50:1.

Using $Ba_{1-x}Zn_xS$ wherein 0<x<1 as the matrix material and Mn and/or Eu as the luminescence center, the invention provides a red phosphor featuring a high luminance and a high efficiency which have never been achieved heretofore.

In the general formula above, part of S may be substituted with O. Oxygen serves to improve the stability of EL devices. The substitution amount may be in the range of 0.001<O/(S+O)<0.3 (atomic ratio).

The phosphor thin film of the present invention produces satisfactory red light having approximate coordinates (0.60–0.70, 0.29–0.40) in CIE 1931 chromaticity diagram.

Optimum values exist in the range of x. While x is in the range of 0<x<1, red light emission with a high luminance from both Mn and Eu as the luminescence center is obtained in the preferred range of $0.1 \leq x \leq 0.9$, more preferably $0.2 \leq x \leq 0.8$, and most preferably $0.35 \leq x \leq 0.6$.

It is noted that in the general formula: $Ba_{1-x}Zn_xS$, the atomic ratio (Ba+Zn)/S is expressed to be 1:1 according to the stoichiometry although this atomic ratio may deviate from 1:1. However, since a substantial deviation of the atomic ration from the stoichiometry impedes the benefits of the invention, it is recommended that the atomic ratio S/(Ba+Zn) be from 0.8 to 1.2, especially from 0.90 to 1.15.

In the invention, barium is used as the alkaline earth element as mentioned above, and one or more other alkaline earth elements such as Be, Mg, Ca, Sr and Ra may be used along with Ba. The other alkaline earth element is added so as to substitute for Ba. That is, when the other alkaline earth element(s) is added, the amount of Ba added is accordingly reduced so that the content of all alkaline earth elements in the matrix material is represented by (1-x) in $Ba_{1-x}Zn_xS$. The total proportion of other alkaline earth elements is preferably up to 30 at % based on the Ba. At too high a proportion of other alkaline earth elements, the benefits of the invention may not be fully achieved.

The phosphor thin film of the above-described material should preferably have a thickness in the range of 50 nm to 1,000 nm, more preferably 150 to 700 nm, even more preferably 200 nm to 400 nm. Too thick a film may require an increased drive voltage whereas too thin a film may result in a low emission efficiency. A film thickness in the above range ensures that an EL device is improved in both the luminance and efficiency of light emission.

In a preferred embodiment, the EL thin film has a structure of ZnS thin film/phosphor thin film/ZnS thin film. Also, the phosphor thin film may have a structure of alternately deposited ZnS and phosphor thin films with the outermost layer being a ZnS thin film like a structure of ZnS thin film/phosphor thin film/ZnS thin film/phosphor thin film/ZnS thin film, or a multilayer structure of ZnS thin film/phosphor thin film/ZnS thin film/(repeated)/phosphor thin film/ZnS thin film.

The sandwiching of the phosphor thin film between ZnS thin films is effective for improving the electric charge injection and withstand voltage of the phosphor thin film so that a red EL thin film with a high luminance and good response is obtainable. The ZnS thin film may have a thickness of 30 to 400 nm, preferably 100 to 300 nm.

Such a phosphor thin film is preferably prepared, for example, by the following evaporation process. Reference is now made to a $Ba_{0.5}Zn_{0.5}S$:Eu phosphor thin film as a typical example.

More particularly, a barium sulfide pellet having europium added and a zinc sulfide pellet are prepared. In a vacuum chamber into which $H_2S$ gas is admitted, these two pellets are evaporated with electron beams (i.e., binary EB evaporation process). The $H_2S$ gas is used so that sulfur may react with the evaporated reactants, in order to avoid the thin film being deposited from becoming short of sulfur.

The formation of a thin film may be followed by annealing treatment. More particularly, after a $Ba_{0.5}Zn_{0.5}S$:Eu phosphor thin film is formed by reactive evaporation using a barium sulfide pellet having Eu added thereto, a zinc sulfide pellet and $H_2S$ gas, annealing treatment is preferably carried out in a reducing atmosphere such as nitrogen, Ar or vacuum or an oxidizing atmosphere such as oxygen or air. For example, after a thin film is formed by reactive evaporation or the like, annealing is carried out in air. The preferred annealing conditions include a temperature in the range of about 500 to 1,000° C., and more preferably about 600 to 800° C. Annealing in an oxidizing atmosphere is effective when the O-substituted composition is to be synthesized.

Eu added to the source substance may take the form of metal, fluoride, oxide or sulfide. Since the amount of Eu added varies depending on the source substance and the thin film to be deposited, the composition of the source substance is adjusted so as to achieve an appropriate dosage.

During the evaporation, the temperature of the substrate may be room temperature to 600° C., preferably 150 to 300° C. If the substrate temperature is too high, the thin film of matrix material may have more asperities on its surface and contain pin holes therein, giving rise to the problem of current leakage on EL devices. Also the thin film can be colored brown. For this reason, the aforementioned temperature range is preferable. The film deposition is preferably followed by annealing. The preferred annealing temperature is 500 to 1,000° C., and more preferably about 600 to 800° C.

The pressure during evaporation is preferably $1.33 \times 10^{-4}$ to $1.33 \times 10^{-1}$ Pa ($1 \times 10^{-6}$ to $1 \times 10^{-3}$ Torr). When a gas such as $H_2S$ is introduced, the pressure may be adjusted to $6.65 \times 10^{-3}$ to $6.65 \times 10^{-2}$ Pa ($5 \times 10^{-5}$ to $5 \times 10^{-4}$ Torr). If the pressure exceeds the range, the operation of the electron gun becomes unstable, and composition control becomes very difficult. The rate of gas feed is preferably 5 to 200 standard cubic centimeters per minute (SCCM), especially 10 to 30 SCCM although it varies depending on the capacity of the vacuum system.

If desired, the substrate may be moved or rotated during evaporation. By moving or rotating the substrate, the deposited film becomes uniform in composition and minimized in the variation of thickness distribution.

When the substrate is rotated, the number of revolutions is preferably at least about 10 rpm, more preferably about 10 to 50 rpm, and especially about 10 to 30 rpm. If the rotational speed of the substrate is too high, there may arise a problem of seal upon admission into the vacuum chamber. If the rotational speed of the substrate is too low, compositional gradation may occur in the thickness direction within the chamber so that the resulting light emitting layer may have poor characteristics. The means for rotating the substrate may be any well-known rotating mechanism including a power source such as a motor or hydraulic rotational mechanism and a power transmission/gear mechanism having a combination of gears, belts, pulleys and the like.

The means for heating the evaporation sources and the substrate may be selected, for example, from tantalum wire heaters, sheath heaters and carbon heaters, as long as they have the predetermined thermal capacity, reactivity or the like. The temperature reached by the heating means is preferably in the range of about 100 to about 1,400° C., and the precision of temperature control is about ±1° C., preferably about ±0.5° C. at 1,000° C.

The $Ba_{1-x}Zn_xS$:Eu phosphor thin film thus formed is preferably a highly crystalline thin film. Crystallinity can be evaluated by x-ray diffraction, for example. To promote crystallinity, the substrate temperature is set as high as possible. It is also effective to anneal the thin film in vacuum, $N_2$, Ar, sulfur vapor or $H_2S$ after its formation. Especially, by forming a sulfide thin film according to the above-mentioned procedure and then effecting annealing treatment in an oxidizing atmosphere, an EL thin film capable of light emission at a high luminance is obtained.

Figure 2:
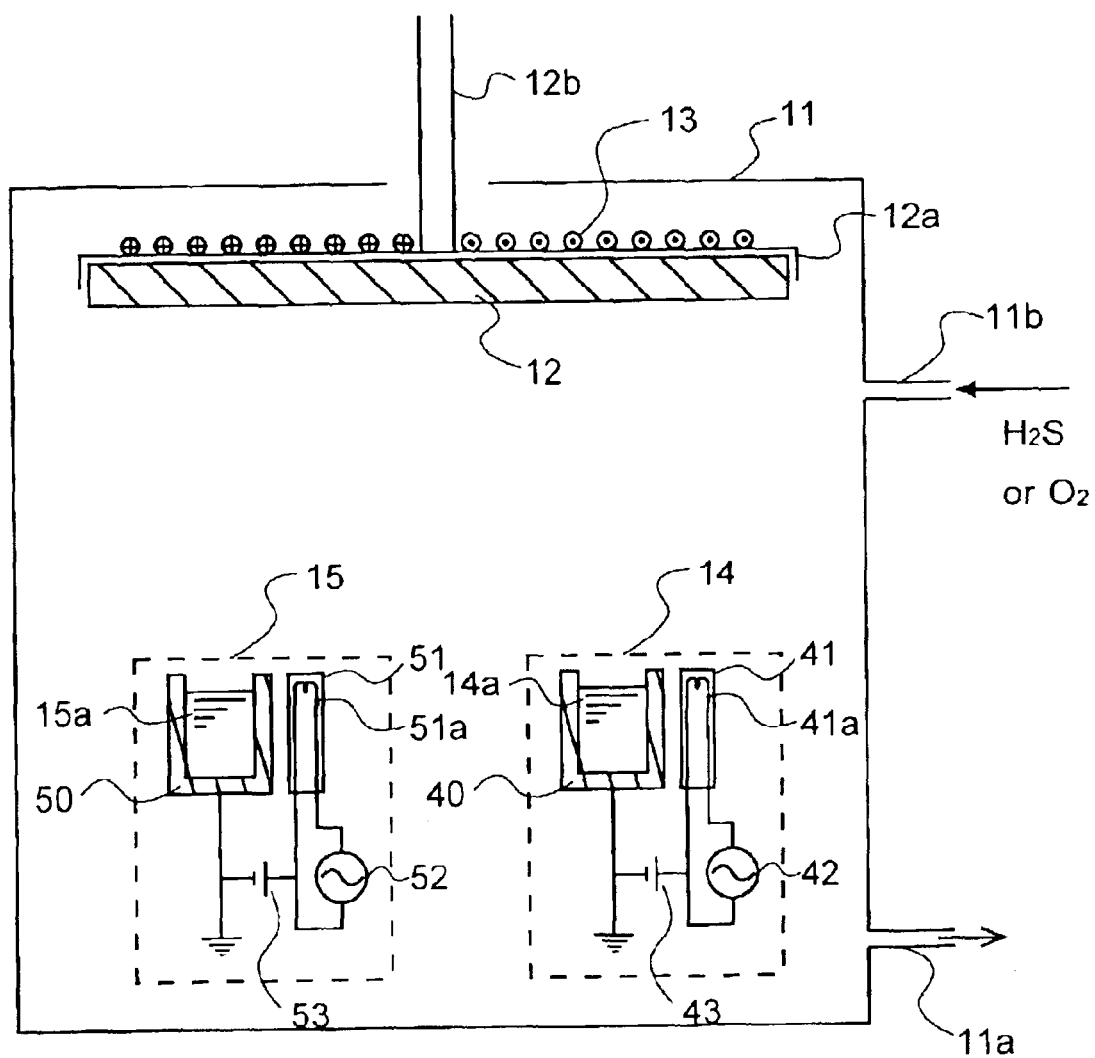
FIG. 2 is a schematic cross-sectional view showing an exemplary construction of an apparatus for depositing a phosphor thin film according to the invention.

FIG. 2 illustrates one exemplary construction of the apparatus for forming the light emitting layer according to the invention. Reference is made to an embodiment wherein Eu-doped barium zinc sulfide thin film is produced by using barium sulfide having Eu added as a luminescence center and zinc sulfide as the evaporation sources and admitting $H_2S$ during evaporation. In the illustrated embodiment, a substrate 12 on which the light emitting layer is to be deposited and EB evaporation sources 14 and 15 are disposed within a vacuum chamber 11.

The electron beam (EB) evaporation source 14 serving as means for evaporating barium sulfide includes a crucible 40 which contains barium sulfide 14a with a luminescence center added and an electron gun 41 having an electron emitting filament 41a built therein. The EB evaporation source 15 serving as means for evaporating zinc sulfide includes a crucible 50 which contains zinc sulfide 15a and an electron gun 51 having an electron emitting filament 51a built therein.

Built in each of the electron guns 41 and 51 is a mechanism for controlling an electron beam. To the electron gun 41, 51 are connected an AC power supply 42, 52 and a bias power supply 43, 53. The electron gun 41, 51 produces an electron beam at a predetermined power in a controlled manner, for evaporating the barium sulfide 14a or zinc sulfide 15a at a predetermined rate. Although the evaporation sources are controlled by the respective electron guns in the illustrated embodiment, it is possible to perform simultaneous evaporation of multiple sources by means of a single electron gun. The evaporation process in this case is referred to as multi-source pulse evaporation process.

In the illustrated embodiment, the evaporation sources 14 and 15 are depicted, for the convenience of illustration, at positions corresponding to local areas of the substrate. Actually, the evaporation sources are located such that the deposited film may become uniform in composition and thickness.

The vacuum chamber 11 has an exhaust port 11a through which the chamber is evacuated to establish a predetermined vacuum in the chamber. The vacuum chamber 11 also has an inlet port 11b through which a reactant gas such as hydrogen sulfide is admitted into the chamber.

The substrate 12 is fixedly secured to a holder 12a. The holder 12a has a shaft 12b which is rotatably held by an outside rotating shaft mount (not shown) so that the vacuum may be maintained in the chamber 11. The shaft 12b is adapted to be rotated at a predetermined number of revolutions by a rotating means (not shown). A heating means 13 in the form of a heater wire is closely secured to the substrate holder 12a so that the substrate may be heated and maintained at the desired temperature.

Using the illustrated apparatus, the vapors of barium sulfide and zinc sulfide are evaporated from the EB evaporation sources 14 and 15 and deposited and bound on the substrate 12 to form a fluorescent layer of Eu-doped barium zinc sulfide. By rotating the substrate 12 during the evaporation process if desired, the light emitting layer being deposited can be made more uniform in composition and thickness distribution.

Figure 3:
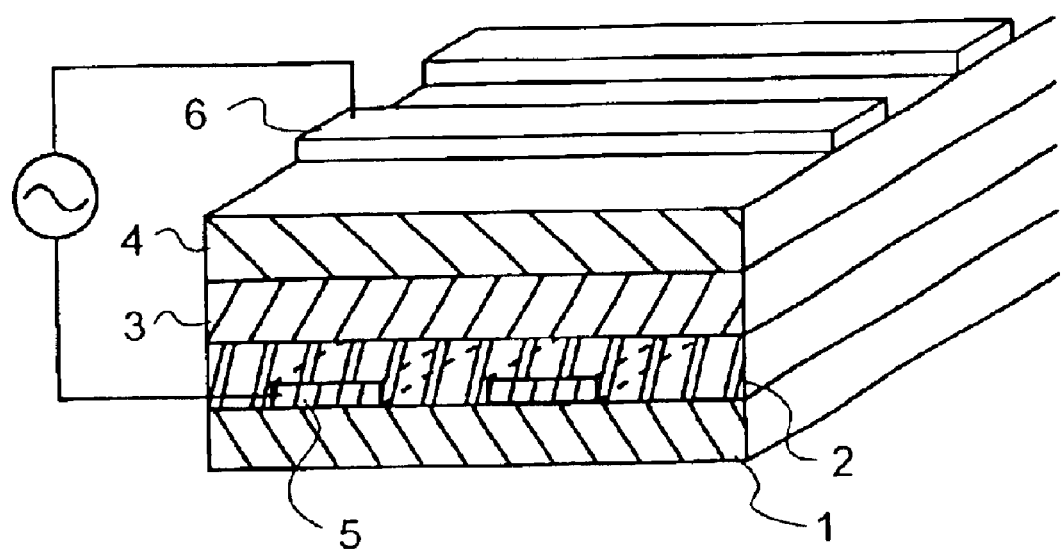
FIG. 3 is a partial cross-sectional view showing an exemplary construction of an inorganic EL device.

Using the phosphor of the invention as a light emitting layer, an inorganic EL device is manufactured, for example, to the structure shown in FIG. 3 or a structure having a thick-film insulating layer as shown in FIG. 1.

FIG. 1 is a partial cross-sectional view showing an exemplary construction of an inorganic EL device using the light emitting layer of the invention. In FIG. 1, a predetermined pattern of lower electrodes 5 is formed on a substrate 1. Disposed on the lower electrodes 5 are a first thick-film insulating layer (or thick-film dielectric layer) 2a and optionally, a dielectric layer 2b formed by a solution coating/firing method such as the sol-gel method or metallo-organic decomposition (MOD) method. On the first insulating layers 2a and 2b, a light-emitting layer 3 and a second insulating layer (or thin-film dielectric layer) 4 are successively formed. On the second insulating layer 4, a predetermined pattern of upper electrodes 6 is formed so as to construct a matrix circuit with the lower electrodes 5.

Between two adjacent ones of the substrate 1, electrodes 5, 6, thick-film insulating layers 2a, 2b, and thin-film insulating layer 4, an intermediate layer such as a bond enhancing layer, stress relief layer or reaction preventing barrier layer may be disposed. The thick film may be improved in smoothness as by polishing its surface or using a smoothing layer (typically the dielectric layer 2b formed by a solution coating/firing method).

Preferably, a BaTiO$_3$ thin-film layer is formed as the barrier layer between the thick-film insulating layer and the thin-film insulating layer.

Any desired material may used as the substrate as long as the substrate has a heat resistant temperature or melting point of at least 600° C., preferably at least 700° C., especially at least 800° C. so that the substrate may withstand the thick-film forming temperature, the forming temperature of the EL fluorescent layer and the annealing temperature of the EL device, the substrate allows deposition thereon of functional thin films such as a light emitting layer by which the EL device can be constructed, and the substrate maintains the predetermined strength. Illustrative examples include glass substrates, ceramic substrates of alumina (Al$_2$O$_3$), forsterite (2MgO.SiO$_2$), steatite (MgO.SiO$_2$), mullite (3Al$_2$O$_3$.2SiO$_2$), beryllia (BeO), aluminum nitride (AlN), silicon nitride (SiN), and silicon carbide (SiC+BeO) as well as heat resistant glass substrates of crystallized glass or the like. Of these, alumina substrates and crystallized glass substrates are especially preferable. Where heat transfer is necessary, beryllia, aluminum nitride, silicon carbide and the like are preferred.

Also useful are quartz, heat oxidized silicon wafers, etc. as well as metal substrates such as titanium, stainless steel, Inconel and iron base materials. Where electro-conductive substrates such as metal substrates are used, a structure in which a thick film having an internal electrode is formed on a substrate is preferred.

Any well-known thick-film dielectric material may be used as the thick-film dielectric material (first insulating layer). Materials having a relatively high permittivity are preferred.

For example, lead titanate, lead niobate and barium titanate based materials can be used.

The dielectric thick film has a resistivity of at least 10$^8$ Ω·cm, especially about 10$^{10}$ to 10$^{18}$ Ω·cm. A material having a relatively high permittivity as well is preferred. The permittivity ε is preferably about 100 to 10,000. The preferred thickness is 5 to 50 μm, especially 10 to 30 μm.

The insulating layer thick film is formed by any desired method. Methods capable of relatively easily forming films of 10 to 50 μm thick are useful, and the sol-gel method and printing/firing method are especially preferred.

Where the printing/firing method is employed, a material is fractionated to an appropriate particle size and mixed with a binder to form a paste having an appropriate viscosity. The paste is applied onto a substrate by a screen printing technique, and dried. The green sheet is fired at an appropriate temperature, yielding a thick film.

Examples of the material of which the thin-film insulating layer (second insulating layer) is made include silicon oxide (SiO$_2$), silicon nitride (SiN), tantalum oxide (Ta$_2$O$_5$), strontium titanate (SrTiO$_3$), yttrium oxide (Y$_2$O$_3$), barium titanate (BaTiO$_3$), lead titanate (PbTiO$_3$), PZT, zirconia (ZrO$_2$), silicon oxynitride (SiON), alumina (Al$_2$O$_3$), lead niobate, PMN-PT base materials, and multilayer or mixed thin films of any. In forming the insulating layer from these materials, any of conventional methods such as evaporation, sputtering and CVD methods may be used. The insulating layer preferably has a thickness of about 50 to 1,000 nm, especially about 100 to 500 nm.

The electrode (lower electrode) is formed at least on the substrate side or within the first dielectric layer. As the electrode layer which is exposed to high temperature during formation of a thick film and during heat treatment along with the light emitting layer, use may be made of a customary metal electrode containing as a main component one or more elements selected from palladium, rhodium, iridium, rhenium, ruthenium, platinum, tantalum, nickel, chromium and titanium.

Another electrode layer serving as the upper electrode is preferably a transparent electrode which is transmissive to light in the predetermined emission wavelength region because the emitted light often exits from the opposite side to the substrate. When the substrate and insulating layer are transparent, a transparent electrode may also be used as the lower electrode because this permits the emitted light to exit from the substrate side. Use of transparent electrodes of ZnO, ITO or the like is especially preferred. ITO generally contains $In_2O_3$ and SnO in stoichiometry although the oxygen content may deviate somewhat therefrom. An appropriate proportion of $SnO_2$ mixed with $In_2O_3$ is about 1 to 20%, more preferably about 5 to 12% by weight. For IZO, an appropriate proportion of ZnO mixed with $In_2O_3$ is generally about 12 to 32% by weight.

Also the electrode may be a silicon-based one. The silicon electrode layer may be either polycrystalline silicon (p-Si) or amorphous silicon (a-Si), or even single crystal silicon if desired.

In addition to silicon as the main component, the electrode is doped with an impurity for imparting electric conductivity. Any dopant may be used as the impurity as long as it can impart the desired conductivity. Use may be made of dopants commonly used in the silicon semiconductor art. Exemplary dopants are B, P, As, Sb, Al and the like. Of these, B, P, As, Sb and Al are especially preferred. The preferred dopant concentration is about 0.001 to 5 at %.

In forming the electrode layer from these materials, any of conventional methods such as evaporation, sputtering, CVD, sol-gel and printing/firing methods may be used. In forming a structure in which a thick film having an internal electrode is formed on a substrate, the same method as used in forming the dielectric thick film is preferred.

The electrode layer should preferably have a resistivity of up to 1 Ω·cm, especially about 0.003 to 0.1 Ω·cm in order to apply an effective electric field across the light emitting layer. The preferred thickness of the electrode layer is about 50 to 2,000 nm, especially about 100 to 1,000 nm although it depends on the electrode material.

The EL panel using the $Ba_{1-x}Zn_xS:Eu$ phosphor thin film of the invention has been described while it can be applied to other forms of display device, typically full-color panels, multicolor panels and partially color panels partially displaying three colors.

EXAMPLE

Examples are given below for illustrating the invention in more detail.

Example 1

A phosphor within the scope of the invention was synthesized. A phosphor was prepared by mixing ZnS powder, BaS powder, and MnS powder and/or EuS powder serving as a luminescence center, then firing the mixture at 1,000° C. in a $H_2S$ atmosphere. This phosphor was examined for photoluminescence to evaluate phosphor emission.

Figure 4:
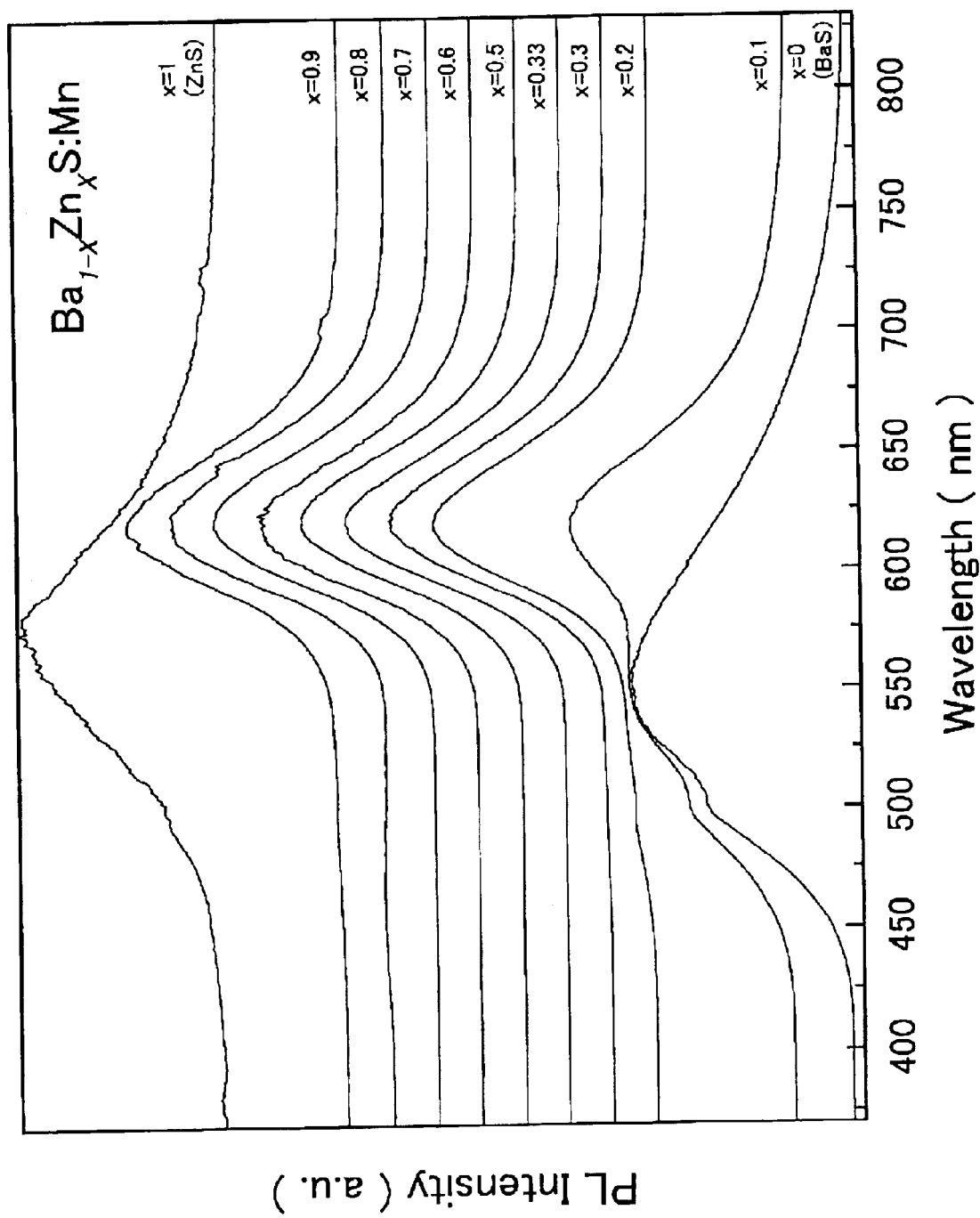
FIG. 4 is a graph illustrating the spectrum of photoluminescence from the phosphor (luminescence center Mn) prepared in Example 1.
Figure 5:
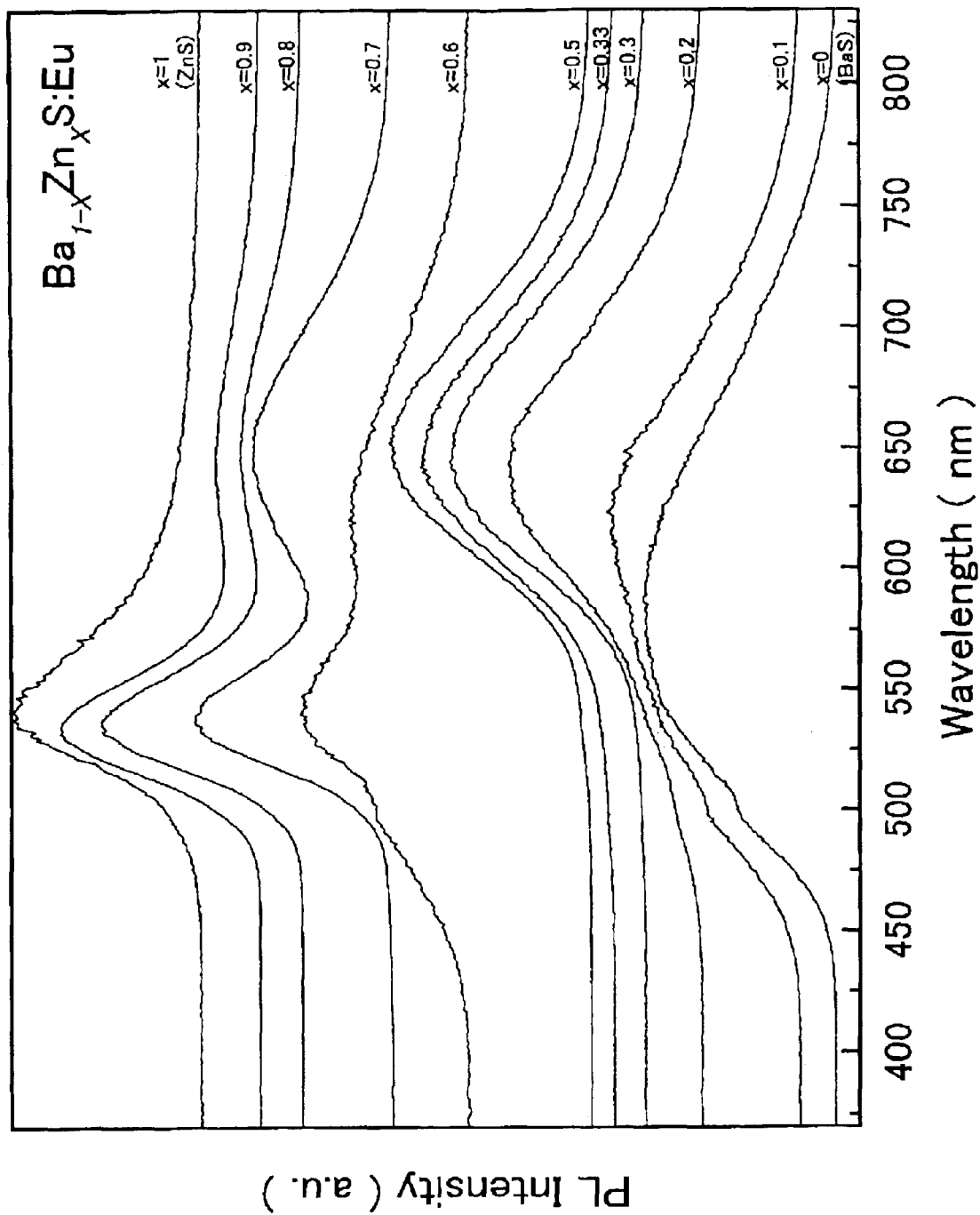
FIG. 5 is a graph illustrating the spectrum of photoluminescence from the phosphor (luminescence center Eu) prepared in Example 1.

FIGS. 4 and 5 are graphs showing the intensity versus wavelength of photoluminescence (PL). FIG. 4 corresponding to the Mn-doped system indicates that red luminescence having a peak wavelength of 620 nm is available throughout the range of $0.1 \leq x \leq 0.9$. FIG. 5 corresponding to the Eu-doped system indicates that red luminescence having a peak wavelength of about 640 nm is available in the range of $0.1 \leq x \leq 0.5$.

For difference compositions of the Eu and Mn-doped system, the intensity of red photoluminescence was measured. As a result, a relative intensity of 60 was marked at x=0.33, a relative intensity of 70 marked at x=0.8, and a maximum relative intensity of 100 marked at $0.35 \leq x \leq 0.6$. It is seen that for the system containing both Eu and Mn as luminescence centers, the emission intensity is enhanced in the range of $0.35 \leq x \leq 0.6$.

Example 2

An EL device (or panel) was fabricated using a phosphor thin film according to the invention. For the substrate and thick-film insulating layer, $BaTiO_3$ base dielectric material having a permittivity of 5,000 was commonly used. For the lower electrode, a Pd electrode was used. On fabrication, a sheet of the substrate was formed, and the lower electrode and thick-film insulating layer were screen printed thereon to form green sheets, which were co-fired. The surface was polished, obtaining the substrate bearing a thick-film first insulating layer of 30 μm thick. On this substrate, a $BaTiO_3$ coating was formed by sputtering as a barrier layer to 400 nm. This was annealed in air at 700° C., obtaining a composite substrate.

On the composite substrate, a structure of $Al_2O_3$ film (50 nm)/EL thin film/$Al_2O_3$ film (50 nm) was formed in order that the resulting EL device produce stable light emission. The EL thin film had a structure of ZnS film (200 nm)/phosphor thin film (200 nm)/ZnS film (200 nm).

The phosphor thin film was prepared by a binary evaporation process.

An EB source containing a BaS pellet and another EB source containing a ZnS pellet having 0.4 mol % Mn added were placed in a vacuum chamber into which $H_2S$ gas was admitted. The reactants were evaporated from the respective sources and deposited on a rotating substrate heated at 150° C., forming a thin film. The evaporation rates of the sources were adjusted such that the film was deposited on the substrate at a deposition rate of 1 nm/s. The $H_2S$ gas was fed at 20 SCCM. In this way, a phosphor thin film was formed. Specifically the thin film was obtained as the structure of $Al_2O_3$ film (50 nm)/ZnS film (200 nm)/phosphor thin film (300 nm)/ZnS film (200 nm)/$Al_2O_3$ film (50 nm). The structure was annealed in air at 750° C. for 10 minutes.

Similarly, a phosphor thin film was formed on a Si substrate. The resulting phosphor thin film in the form of $Ba_{1-x}Zn_xS:Mn$ thin film was analyzed for composition by fluorescent x-ray analysis, finding an atomic ratio of Ba:Zn:S:Mn=5.96:40.76:52.90:0.38. That is, the film consisted of $Ba_{0.13}Zn_{0.87}S_{1.13}$ matrix material with a Mn concentration of 0.8 mol % based on Ba+Zn.

By RF magnetron sputtering technique using an ITO oxide target, a transparent ITO electrode of 200 nm thick was formed on the resulting structure at a substrate temperature of 250° C. to complete an EL device.

By applying an electric field having a frequency of 1 kHz and a pulse width of 50 μs to the two electrodes of the EL device, red light emission having a luminance of 400 cd/m² and (0.58, 0.42) in CIE 1931 chromaticity diagram was produced. The response of this EL device was improved to 20 ms or less over the response of several seconds to several tens of seconds in the prior art. It is evident that the invention provides an EL device achieving a significantly higher luminance than a prior art EL device using a conventional red phosphor CaS:Eu and producing a luminance of about 80 cd/M².

Example 3

As in Example 2, an EL device was fabricated using $Ba_{1-x}Zn_xS: Eu,Mn$.

The phosphor thin film was prepared by a binary evaporation process. An EB source containing a BaS pellet having 5 mol % Eu added and another EB source containing a ZnS pellet having 0.4 mol % Mn added were placed in a vacuum chamber into which $H_2S$ gas was admitted. The reactants were simultaneously evaporated from the respective sources and deposited on a rotating substrate heated at 150° C., forming a thin film.

The phosphor thin film obtained was analyzed for composition by fluorescent x-ray analysis, finding an atomic ratio of Ba:Zn:S:Mn:Eu=27.3:30.08:57.90:0.38:1.90. That is, the film consisted of $Ba_{0.48}Zn_{0.52}S_{1.01}$ matrix material while the concentrations of Mn and Eu were 0.66 mol % and 3.3 mol %, respectively, based on Ba+Zn.

Figure 6:
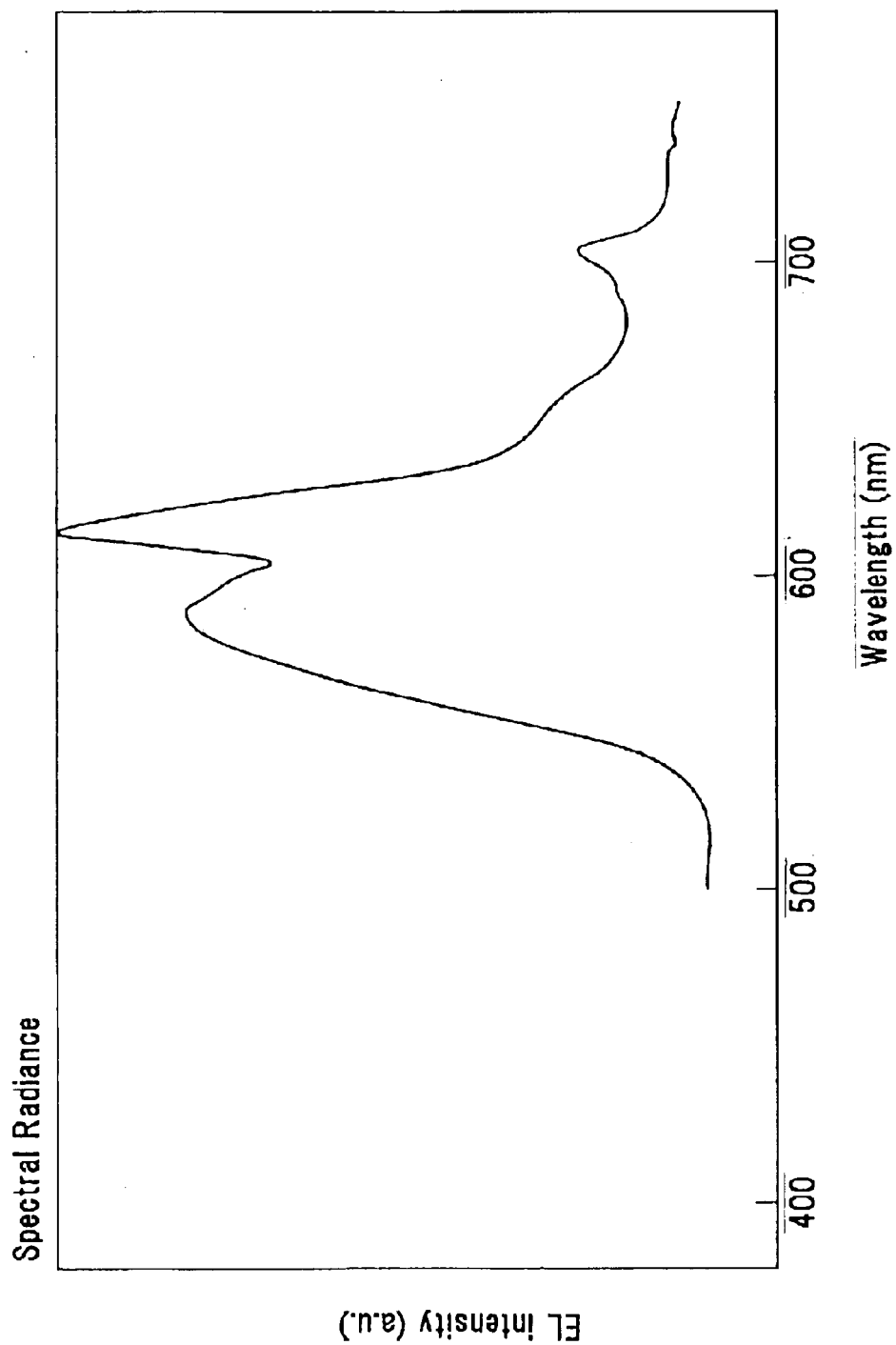
FIG. 6 is a graph illustrating a light emission spectrum of the EL device or panel fabricated in Example 3.

By applying an electric field having a frequency of 1 kHz and a pulse width of 50 μs to the two electrodes of the EL device, red light emission having a luminance of 50 cd/m² was produced. FIG. 6 shows the emission spectrum of this device. The emission spectrum of FIG. 6 is a mixture of spectra from divalent Eu, trivalent Eu and divalent Mn, indicating a possibility that three species of luminescence center simultaneously produce emissions. Since all these three species of emission can be utilized as red components, the luminance of EL emission is increased.

Example 4

An EL device or panel of different type comprising a light emitting layer using a phosphor within the scope of the invention was fabricated by the following procedure. This EL device has the FIG. 3 structure described previously.

First, on a glass substrate, an ITO layer having a film thickness of 200 nm was deposited as a lower electrode layer by a sputtering technique, and $BaTa_2O_6$ having a film thickness of 320 nm was then deposited as an insulating layer by an evaporation technique. The structure was annealed in air at 400° C. for 60 minutes, obtaining a composite substrate.

On the composite substrate, a phosphor thin film was deposited to a thickness of 400 nm by a pulse evaporation technique. A BaS pellet having 5 mol % Eu added and a ZnS pellet were used as evaporation sources, and electron beam pulses were adjusted such that the phosphor thin film deposited had the composition $Ba_2ZnS_3$:Eu. The substrate temperature was 150° C. during the deposition, and the deposition rate was 0.7 nm/s. This was followed by annealing in vacuum at 800° C. for 10 minutes.

Next, on the phosphor thin film, $BaTa_2O_6$ having a film thickness of 320 nm was deposited as a second insulating layer by an evaporation technique. Finally, Al was evaporated with EB to form an upper electrode layer of 200 nm thick on the second insulating layer, completing an EL device.

Figure 7:
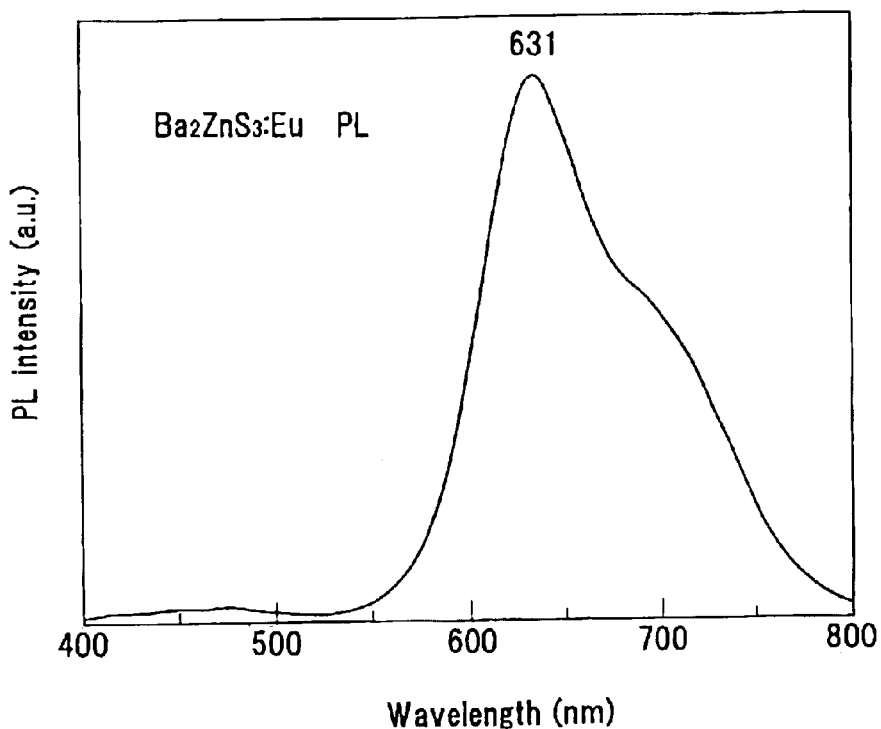
FIG. 7 is a graph illustrating the spectrum of photoluminescence from the EL device or panel fabricated in Example 4.

The emission characteristics of the EL device were evaluated. First, photoluminescence was measured. FIG. 7 is a graph showing the intensity versus wavelength of photoluminescence, which indicates the emission of red light having a peak wavelength of 631 nm.

Figure 8:
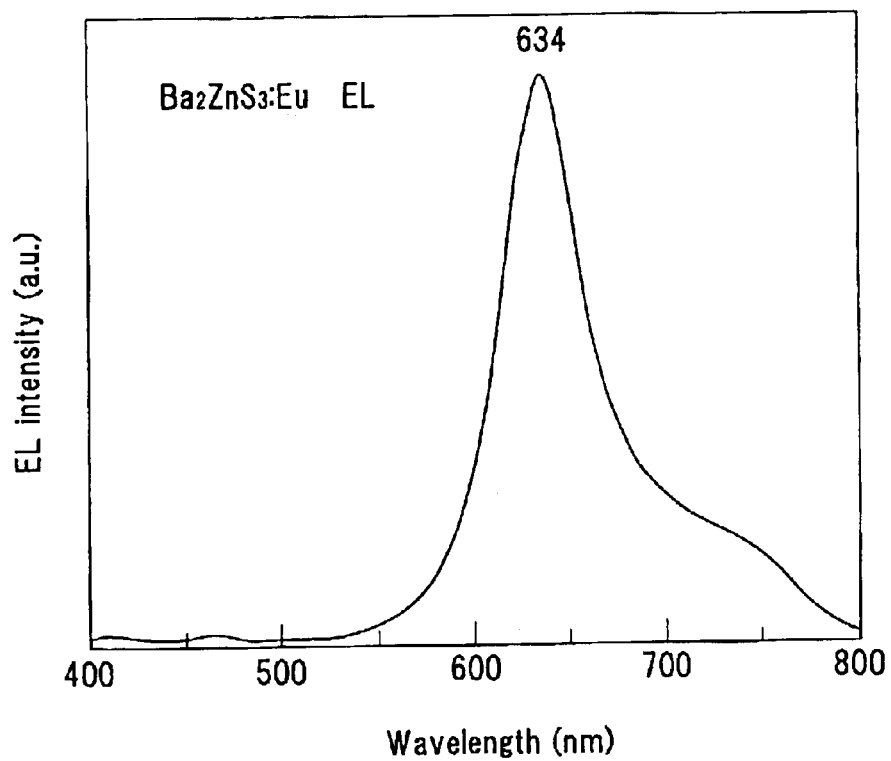
FIG. 8 is a graph illustrating the spectrum of electroluminescence from the EL device or panel fabricated in Example 4.

Next the EL spectrum of the EL device was determined by connecting leads to the upper and lower electrodes and applying an ambipolar electric field having a frequency of 1 kHz and a pulse width of 50 μs. FIG. 8 is a graph showing the intensity versus wavelength of electroluminescence, which indicates the emission of red light having a peak wavelength of 634 nm. This device produced red EL emission at a luminance of 10 cd/m².

It is thus evident that the phosphor of the invention is a phosphor thin-film material capable of emitting red light of a good color purity and a high luminance without a need for a filter. An EL device using the inventive phosphor can achieve a high luminance.

The EL device using the phosphor is improved in response, enables to produce a light emitting layer in a reproducible manner when multicolor EL devices or full color EL devices are formed, and is thus of great commercial worth.

There have been described a phosphor which emits light of a sufficient color purity and luminance to eliminate a need for a filter and in good response, and especially a phosphor thin film which emits red light suitable in a full-color EL panel as well as an EL panel comprising the same.

What is claimed is:

1. A phosphor comprising a matrix material of the general formula: $Ba_{1-x}Zn_xS$ wherein 0<x<1, and a luminescence center contained therein, wherein said phosphor is obtained by a method comprising evaporating with electron beams the combination of barium sulfide containing the luminescence center, and zinc sulfide in a vacuum chamber into which $H_2S$ gas is admitted.

2. The phosphor of claim 1 wherein said luminescence center is Mn or a Mn compound.

3. The phosphor of claim 1 wherein said luminescence center is Eu or an Eu compound.

4. The phosphor of claim 1 wherein said luminescence center is a mixture of Eu or an Eu compound and Mn or a Mn compound.

5. The phosphor of claim 1 wherein $0.1 \leq x \leq 0.9$.

6. The phosphor of claim 5 wherein $0.2 \leq x \leq 0.8$.

7. The phosphor of claim 6 wherein $0.35 \leq x \leq 0.6$.

8. The phosphor of claim 1 wherein said red light-emitting phosphor produces red light having approximate coordinates (0.60–0.70, 0.29–0.40) in CIE 1931 chromaticity diagram.

9. The phosphor of claim 1 which is in the form of a thin film.

10. The phosphor of claim 9 wherein the thin film has a thickness of 50 nm to 1,000 nm.

11. A method of preparing the phosphor of claim 1 comprising evaporating with electron beams the combination of barium sulfide containing the luminescence center, and zinc sulfide in a vacuum chamber into which $H_2S$ gas is admitted.

12. The method of claim 11 wherein said evaporation is followed by an annealing treatment.

13. An EL panel comprising the phosphor of claim 1.

14. The EL panel of claim 13 wherein the phosphor is present as a thin film in a ZnS thin film/phosphor thin film/ZnS structure.

15. The EL panel of claim 14 wherein the structure is one of alternately deposited ZnS and phosphor thin films with the outermost layer being a ZnS thin film.

16. The EL panel of claim 14 wherein the structure is a multilayer structure of ZnS thin film/phosphor thin film/ZnS thin film/repeated structure of phosphor thin film and ZnS thin film.

17. A phosphor comprising a matrix material derived from a matrix of the general formula: $Ba_{1-x}Zn_xS$ wherein 0<x<1, and a luminescence center contained therein, wherein said phosphor is obtained by a method comprising evaporating with electron beams the combination of barium sulfide containing the luminescence center, and zinc sulfide in a vacuum chamber into which $H_2S$ gas is admitted, and substituting part of the Ba in $Ba_{1-x}Zn_xS$ with at least one element selected from the group consisting of Be, Mg, Ca, Sr and Ra.

18. A phosphor comprising a matrix material derived from a matrix of the general formula: $Ba_{1-x}Zn_xS$ wherein 0<x<1, and a luminescence center contained therein, wherein said phosphor is obtained by a method comprising evaporating with electron beams the combination of barium sulfide containing the luminescence center, and zinc sulfide in a vacuum chamber into which $H_2S$ gas is admitted, and substituting part of the S in $Ba_{1-x}Zn_xS$ with O.

19. The phosphor of claim 18 wherein O is substituted in an amount of $0.001<O<0.3$ in an atomic ratio relative to S+O.

20. A method of preparing a phosphor comprising a matrix material of the general formula: $Ba_{1-x}Zn_xS$ wherein $0<x<1$, and a luminescence center contained therein, said method comprising evaporating with electron beams the combination of barium sulfide containing the luminescence center, and zinc sulfide in a vacuum chamber into which $H_2S$ gas is admitted.

21. The method of claim 20 wherein said evaporation is followed by an annealing treatment.

* * * * *